United States Patent
Williamson et al.

(10) Patent No.: US 11,104,585 B2
(45) Date of Patent: Aug. 31, 2021

(54) METHOD TO PRODUCE SALTS CONTAINING ACTINIDE HALIDES

(71) Applicant: UCHICAGO ARGONNE, LLC, Chicago, IL (US)

(72) Inventors: Mark A. Williamson, Naperville, IL (US); James L. Willit, Batavia, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 92 days.

(21) Appl. No.: 16/029,403

(22) Filed: Jul. 6, 2018

(65) Prior Publication Data
US 2020/0010335 A1 Jan. 9, 2020

(51) Int. Cl.
*C01G 43/00* (2006.01)
*C01G 43/08* (2006.01)
*C25C 3/34* (2006.01)
*G21C 19/46* (2006.01)

(52) U.S. Cl.
CPC ........... *C01G 43/003* (2013.01); *C01G 43/08* (2013.01); *C25C 3/34* (2013.01); *G21C 19/46* (2013.01)

(58) Field of Classification Search
CPC ........ C01G 43/08; C01G 43/003; C25C 3/34; G21C 19/46; G21C 19/48; G21C 19/50
See application file for complete search history.

(56) References Cited

U.S. PATENT DOCUMENTS

| 3,982,928 | A | * | 9/1976 | Chiotti | ................ C22B 60/0286 75/399 |
| 4,222,998 | A | * | 9/1980 | Buckle | ................... C01G 29/00 423/491 |
| 7,217,402 | B1 | | 5/2007 | Miller et al. | |

OTHER PUBLICATIONS

Lambert et al, "Preparation of uranium (III) in a molten chloride salt: a redox mechanistic study", Journal of Radioanalytical and Nuclear Chemistry, Jun. 28, 2018, pp. 925-932 (Year: 2018).*

\* cited by examiner

*Primary Examiner* — Ngoc-Yen Nguyen
(74) *Attorney, Agent, or Firm* — Cherskov Flaynik & Gurda, LLC

(57) ABSTRACT

A method of producing uranium halides is disclosed in which chlorine gas is introduced into a liquid uranium-nickel alloy. NaCl salt is surrounding the crucible containing the liquid uranium-nickel alloy, producing a eutectic mixture of $NaCl$—$UCl_3$. Upon chlorination, the metal halide dissolves in the matrix salt forming a solution. Adding the reactant metal, uranium to the nickel, the alloy is able to remain molten throughout processing. The liquid metal alloy may be removed from the salt bath, while the halogen gas continues to enter the system through the sparge until the desired composition of $NaCl$—$UCl_3$—$UCl_4$ is achieved. The method and system can be used to produce other metal halide salts such as actinide, lanthanide or transition metal halides contained in a matrix salt consisting of alkali and/or alkaline earth halides.

10 Claims, 4 Drawing Sheets

Scalable Approach to Metal Halide Formation

Alloy Crucible

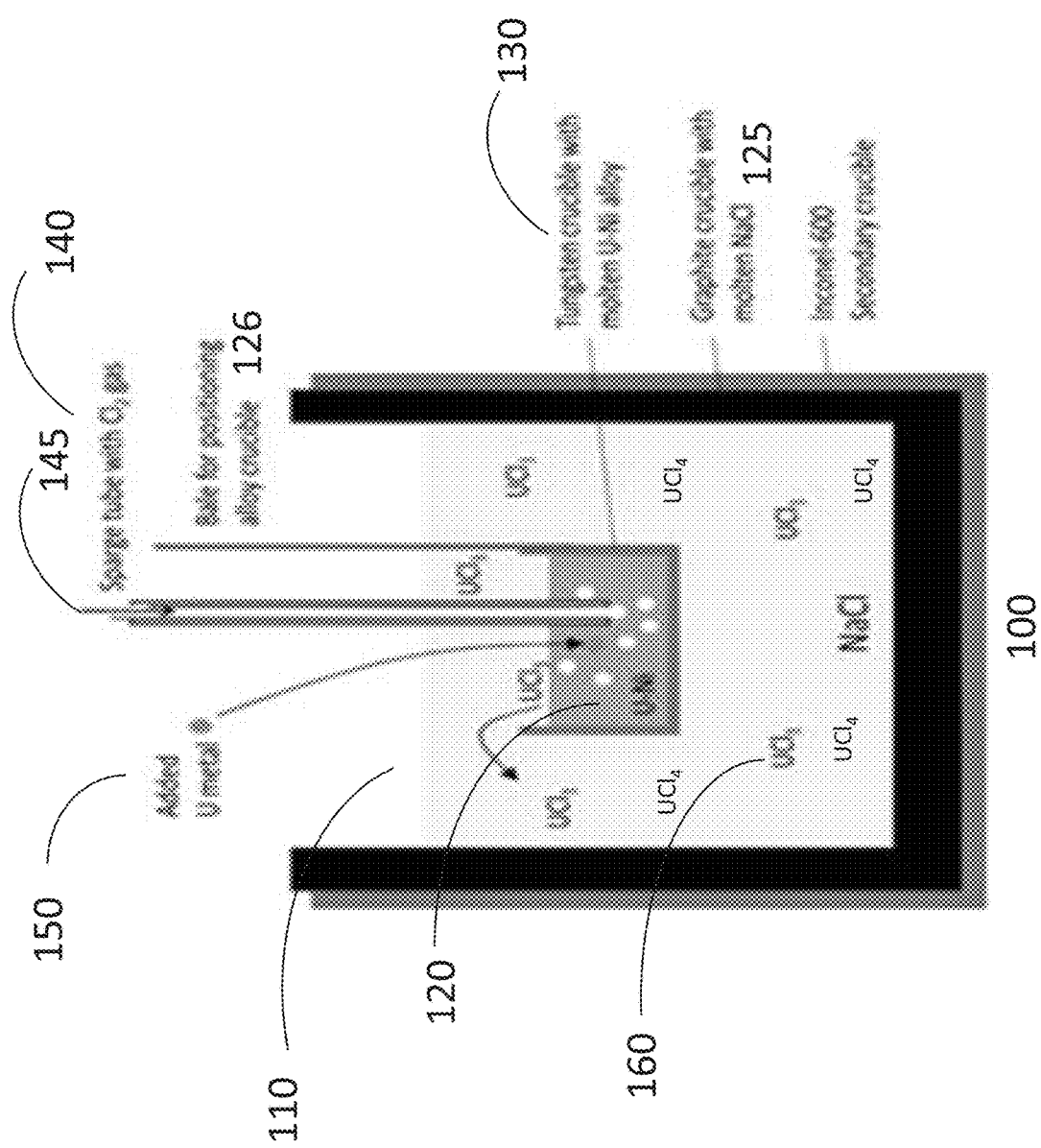
Fig. 1A Scalable Approach to Metal Halide Formation

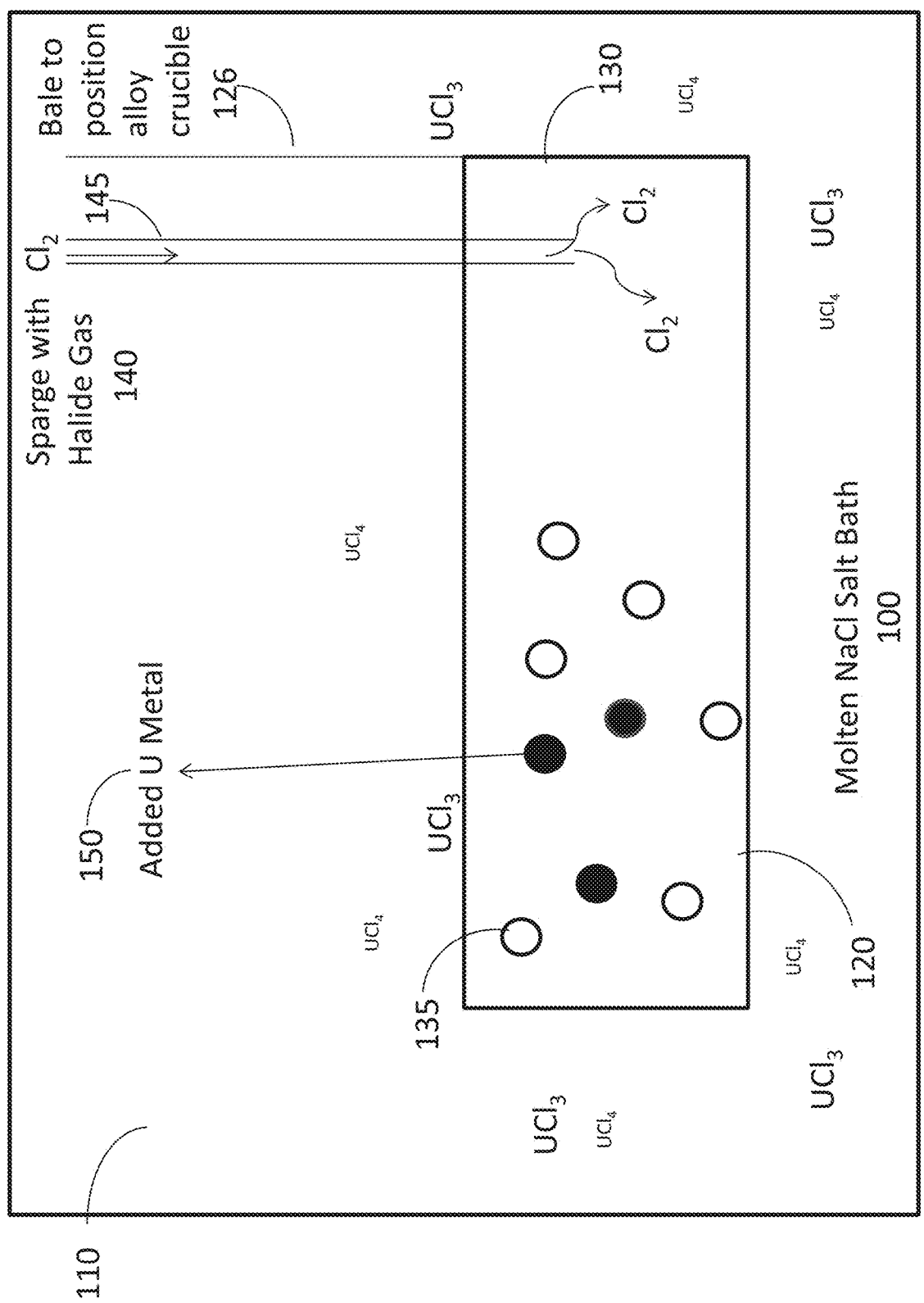
Fig. 1B Alloy Crucible

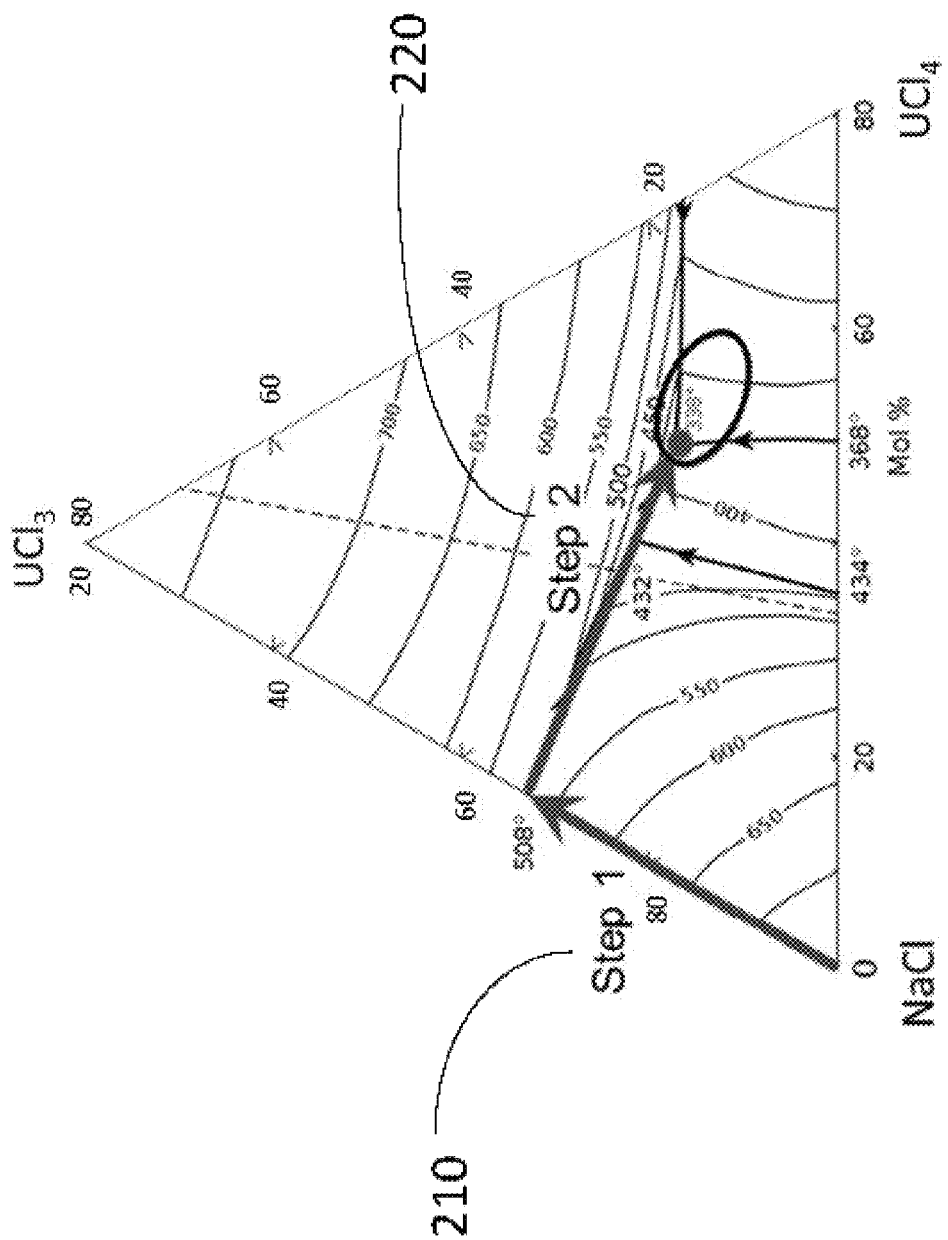
Fig. 2 Production of NaCl-UCl$_3$ – UCl$_4$ Salt

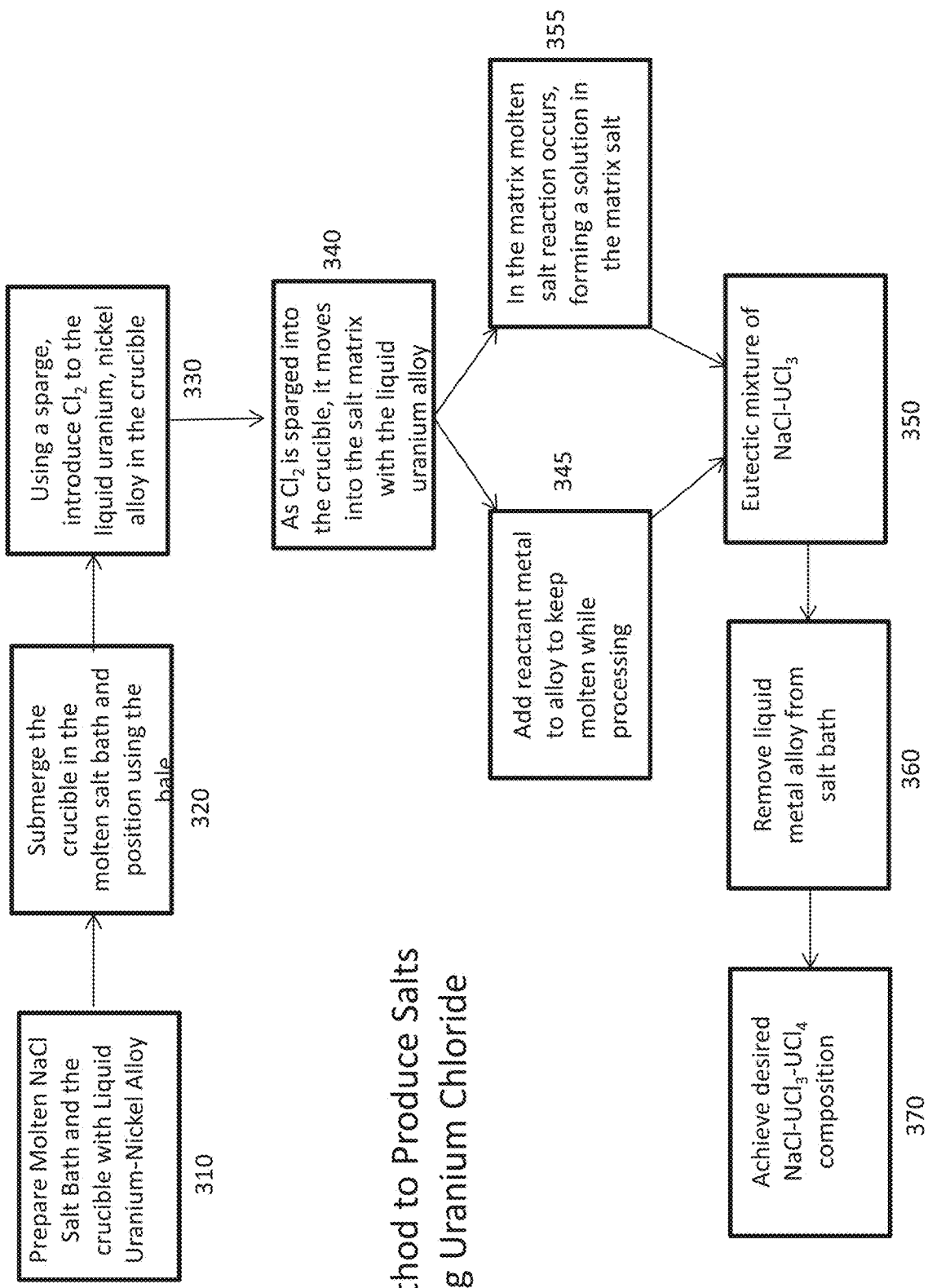
Fig. 3 Method to Produce Salts Containing Uranium Chloride

METHOD TO PRODUCE SALTS CONTAINING ACTINIDE HALIDES

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to a method to produce salts containing a metal halide and more specifically, this invention relates to a low temperature, scalable system with minimal to no waste discharge and a method for dissolving a metal halide in a matrix halide salt by halogenation of the metal, with a halogen gas.

2. Background of the Invention

The molten form of metal halides is a typical component in pyro-chemical processes as it is important in the reprocessing of spent nuclear fuels. Numerous synthesis methods exist for producing small quantities of such halides, including uranium chlorides.

For example, existing reaction pathways utilize a chlorine compound and typically require purification via a secondary reaction sequence. These pathways do not efficiently eliminate residual lower or higher valent uranium chlorides. Synthesis pathways that yield unwanted lower or higher valent compounds of uranium could lead to ancillary oxidation or reduction reactions occurring in the final salt that could contaminate the salt with unwanted metals or metal halides. Furthermore, the current reaction pathways to uranium chloride are not operated at 100 percent efficiency nor are they capable of producing large quantities of the salt in a single batch process. Finally, state of the art methods for producing metal halides use higher melting metals such as cadmium, which then must be further processed to obtain the target metal halide. This creates additional process steps, and disposal issues.

Methods which utilize HCl or $Cl_2$ as the chlorinating agent result in extensive levels of corrosion in ferrous metal containers and any associated ferrous-based process equipment. This corrosion side reaction limits the quantity of uranium chloride which may be produced at a given point in time. Further the current methods of chloride salt synthesis are not used as stand-alone processes, but typically as adjuncts in other processes or operations. Other chlorinating methods based on organic chlorides such as $CCl_4$, $CH_2Cl_2$, etc., result in unwanted reaction products including phosgene gas that must be treated before disposal as waste.

As a component in the process used in molten salt reactors, chloride salts (and NaCl in particular) were previously thought to have good nuclear, chemical, and physical properties. However, NaCl has a high melting point, requiring it to be blended with other salts such as KCl, CsCl, $MgCl_2$ or $CaCl_2$ to form lower melting solutions. These additions often result in the addition of actinide trichlorides so that the mixture becomes eutectic. A eutectic mixture is preferred over the binary chlorides within this process because it leads to a lower liquid temperature for the fluid, thus mitigating corrosion reactions and allowing the use of less costly structural materials.

In pyro-processing applications, molten LiCl is considered a promising option for the electrochemical reduction process for a myriad of reasons:
the operating temperature is lower than other commonly used salts such as $CaCl_2$;
a high current efficiency may be achieved; and
it is compatible with the other electrochemical processes such as electro-refining in which actinides are separated from fission products found in used nuclear fuel.

A eutectic mixture of LiCl—$UCl_3$ used in the electrorefining process enables a more efficient method for fuel recycling and minimizes the amount of salt waste discharged from the overall treatment process.

Chemistries for this process include those depicted in Equations 1-4, infra:

Electroreduction:

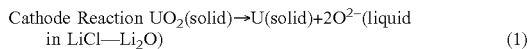

Cathode Reaction $UO_2$(solid)→U(solid)+$2O^{2-}$(liquid in LiCl—$Li_2O$)   (1)

Anode Reaction $2O^{2-}$(liquid in LiCl—Li2O)+C (solid)→$CO_2$(gas)   (2)

Electrorefining

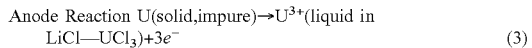

Anode Reaction U(solid,impure)→$U^{3+}$(liquid in LiCl—$UCl_3$)+$3e^-$   (3)

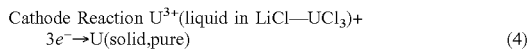

Cathode Reaction $U^{3+}$(liquid in LiCl—$UCl_3$)+$3e^-$→U(solid,pure)   (4)

A need exists in the art for a process to produce actinide halides which does not generate reactive or hazardous waste streams. The process should be highly scalable for industrial applications. The system should be useable as a stand-alone process or incorporated as a component in another existing process such as electrorefining. Also, the process should be highly efficient to minimize the need for off-gas treatment (e.g., unreacted chlorine gas) while generating a minimal waste stream.

SUMMARY OF INVENTION

An object of the invention is to provide a system and method for producing uranium chloride which overcomes many of the drawbacks of the prior art.

A primary object of the invention is to provide a method for producing a metal halide. A feature of the method is halogenation of the metal in the first step of the process. (The metal, which is initially a constituent of a low melting alloy, is halogenated with a halogen gas.) Another feature is that the method utilizes direct chlorination of a binary eutectic mixture in a second step. An advantage of the method is that it does not require extreme temperatures and is readily scalable. Another advantage is that the method eliminates the need for a chlorine carrying metal, such as $CdCl_2$ to transport chlorine to the pure target metal that is ultimately to be halogenated.

Another object of the invention is to provide a system to efficiently produce large quantities of salts containing uranium chloride in either a continuous or batch process. A feature of the invention is utilization of a crucible containing a low melting point alloy submerged within a matrix salt. Another feature of the invention is the introduction of a reactant metal (e.g., uranium) during the process to keep the metal alloy in a molten phase throughout processing by replenishing the metal (e.g., uranium) reacting with the chlorine gas. An advantage is that minimal to no excess chlorine is released. Also, this method eliminates the salt trace impurities by sequestering them in the alloy. Another advantage is that the process utilizes direct chlorination of a binary eutectic alloy via chlorine gas injection (and so eliminating the need for a chlorine carrying metal that is soluble in the molten salt solution) thereby more efficiently chlorinating uranium. The process treats a binary eutectic salt mixture via chlorine gas injection to more efficiently yield a mixture of metal halides in the salt.

Still another object of the invention is to provide a system for producing salts containing uranium chloride without the use of temperatures above about 825° C. A feature of the invention is chlorinating metal halide species to form a solution, whereby the solution resides within a matrix salt. An advantage of the invention is that it yields a high purity product when high purity feed materials are used. Another advantage is that the system may operate as an individual process or be incorporated into another process operation such as in an electrorefiner or in a molten salt reactor.

Yet another object of the present invention is to provide a method for producing large quantities of uranium chloride salt for nuclear energy applications. A feature of the method is a two-step method to produce a eutectic mixture of uranium salt comprising NaCl— $UCl_3$— $UCl_4$. An advantage of the invention is that it yields large quantities of uranium salts while minimizing the waste impurity contamination and the generation of secondary waste streams. Another advantage is that it allows for the removal of the liquid metal alloy from the salt bath simultaneous with the halogen gas continually fed to the system until the desired composition of NaCl—$UCl_3$—$UCl_4$ is achieved.

Briefly, the invention provides a method for producing salts of uranium halide, the method comprising: establishing a molten salt bath; confining uranium metal alloy within a specific region within the bath wherein the specific region is in constant fluid communication with the salt bath; contacting the alloy with a halogen gas in a first reaction to halogenate the uranium; and contacting the halogenated uranium with the salt bath in a second reaction to form a eutectic mixture comprising the mixed valent uranium salts.

Also provided is a method for producing a metal halide, the method comprising submerging a liquid alloy containing an element of the halide in a molten salt bath; contacting the alloy with halogen in a first reaction to form a first metal halide, wherein the element is more electropositive than the halogen; and contacting the first metal halide with the molten salt bath in a second reaction to form a second metal halide.

The invention further provides a system for producing metal halides, the system comprising: a heated vessel; wherein the vessel is maintained in a dry inert atmosphere; a chemically inert crucible positioned within the heated vessel, the crucible adapted to receive uranium alloy; a sparge tube with a first depending end positioned within the crucible and a second superior end in fluid communication with a halogen gas supply; a molten salt bath covering the crucible; and; a bale for retrieving the crucible from the salt bath.

BRIEF DESCRIPTION OF DRAWING

The invention together with the above and other objects and advantages will be best understood from the following detailed description of the preferred embodiment of the invention shown in the accompanying drawings, wherein:

FIG. 1A is a schematic of a scalable approach to metal halide formation in a matrix halide salt, in accordance with features of the present invention;

FIG. 1B is a schematic of system to produce metal halides, in accordance with features of the present invention;

FIG. 2 is a phase diagram of a NaCl—$UCl_3$—$UCl_4$ system, in accordance with features of the present invention; and FIG. 3 is a flow chart of the method to produce salts containing uranium chloride, in accordance with features of the present invention.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention provides a method to produce metal halide $MX_n$. The feedstock M is originally supplied as a liquid alloy and then mixed with halogen gas for a time sufficient to form the metal halide MX. Chemistry for the invented method is depicted in Equation 5, infra:

$$M_{(liquid\ alloy)} + \frac{n}{2}X_2(g) \rightarrow MX_{n\ (liquid\ salt)} \qquad \text{Equation 5}$$

For example, the invention provides high yield, efficient production of salts containing uranium chloride. The invented system utilizes a salt (e.g., NaCl) matrix in continual fluid communication with a liquid uranium nickel alloy as the uranium feedstock. (Aside from nickel, other alloying meals are suitable, including, but not limited to Bi, Ga, Fe, Al, and combinations thereof.)

The liquid uranium nickel alloy is confined to a crucible submerged in the matrix salt. Chlorine gas is then sparged into the liquid uranium nickel alloy.

The metal halide $MX_n$ product remains in chemical communication with the metal M within the alloy, such that the metal halide formed will be the stable halide with the smallest value of n for that system in equilibrium with the metal M. In this embodiment, the metal is uranium and the alloy is molten U—Ni, the halide formed by sparging chlorine gas into the molten salt alloy will be $UCl_3$. The sparge rate and concentration of the halide can be determined empirically and controlled such that the reaction occurs at 100 percent efficiency.

If it is desired to achieve a higher valent metal halide to achieve a desired chemistry in the end use or mixture of a higher valent halide with $MX_n$ in the molten salt solution, the metal alloy is removed from the system and chlorine gas is sparged directly into the molten salt solution. This provides a means for converting $MX_n$ to a higher valent halide.

The ultimate composition of the molten salt solution is achieved by controlling the pressure and time for chlorination. The system may be maintained in a dry inert atmosphere (e.g., argon or helium) to maintain product purity and eliminate unwanted side reactions with the atmosphere or its impurities. Dry in this case would be approximately one hundred of ppm of water or less, depending on the reacting metal utilized. Such atmospheres may be supplied via a glovebox, blast box or other similar enclosure chemically isolated from ambient pressures, temperatures and atmospheres.

The reaction may occur at any chlorine pressure. As long as the uranium chloride product is in equilibrium with the uranium metal, the halide will have the lowest value of n. If all the uranium is consumed to form a chloride, then the valence state of uranium will continue to increase with the amount of chlorine added to the system.

The process produces essentially no waste stream and is scalable for industrial application. The process may be used as a stand-alone process or incorporated as a component in another process operation such as in an electrorefiner or in a molten salt reactor. The process minimizes the need for off-gas treatment of unreacted chlorine gas. This compares favorably to state of the art processes which require a secondary reaction to eliminate the residual lower or higher valent uranium chlorides to further purify the chloride product.

FIG. 1A is a schematic diagram of the invented system, generally designated as numeral 100. The system comprises a first crucible 125, constructed from graphite, glass carbon, or other salt resistant material, and a second crucible 130, constructed for example from tungsten that is compatible with the liquid alloy and salt, wherein the second crucible 130 is positioned within the first crucible 125. The second crucible may or may not contact the bottom or sides of the first crucible. A first volume of molten salt 110 is contained within the first crucible 125 to a level sufficient to submerge the second crucible 130. The second crucible 130 may or may not be permeable to some of the reactants utilized in the invented method and system.

Metal comprising the metal constituent of the product metal halide is initially supplied to the second, submerged crucible 130 as a metal alloy. For example, uranium nickel alloy is placed within the submerged crucible via a dedicated conduit therefor so as to allow for continuous operation. Alternatively, the crucible is loaded with an initial charge of the alloy in the inert atmosphere enclosure, then lowered into the molten salt. Halogen gas 140 is then contacted with the crucible-contained alloy for a time sufficient to effect the reaction depicted in Equation 5, supra. Composition adjustments (i.e., adding uranium) to the alloy are made throughout the process. This approach allows for long production runs (or even continuous production runs) to produce the halide salt.

Temperatures within the first crucible 125 can range between 250° C. and 850° C. depending on the melting point of the salt matrix and alloy, and preferably between 300° C. and 825° C. Preferably, temperatures are not higher than 900° C.

Preferably, the crucible 130 is submerged within the molten salt base 110 so when the halogen gas 140 reacts with the liquid uranium nickel alloy 120 to generate a metal halide 160, $UCl_3$; the $UCl_3$ diffuses into the molten salt matrix 110.

Halogen gas 140, $Cl_2$, is fed into the system 100 by a sparge tube 145, which feeds directly into the liquid uranium nickel alloy 120 contained in an alloy crucible 130. Generally, the sparge tube 145 comprises a heat resistant material capable of withstanding temperatures of approximately 850° C. For example, the sparge tube 145 may consist of an outer W or Ta sheath and an inner BeO tube. The W or Ta sheath confers heat and corrosion resistance to the matrix salt while the inner BeO tube provides heat and corrosion resistance from pure chlorine gas.

The molten uranium 120 and halogen gas 140 react to generate the metal halide 160 $UCl_3$, which is sparingly soluble in the molten alloy and diffuses up to the molten NaCl base salt 100. To keep the liquid uranium-nickel alloy 120 liquid, small amounts of uranium metal 150 are periodically added to the alloy crucible 130 to replenish the converted uranium and keep the alloy in liquid phase at operating temperature. Alternatively, nickel could precipitate from the liquid alloy as uranium from the alloy is depleted, but then it is re-dissolved when more uranium is added. A preferred operation is to keep the alloy in liquid phase throughout the process. Only the molten $UCl_3$ dissolves into the molten salt mixture 110.

The amounts of halogen gas 140 and metal uranium 150 added depending on the amount of $UCl_3$ that is to be generated. When the target amount of $UCl_3$ has been generated to form a $UCl_3$—NaCl eutectic mixture (approximately 31 mole percent $UCl_3$ in NaCl) the crucible 130 and the halogen gas sparge tube 145 is lifted out of the salt mixture by a bale 126. The resulting salt composition can be monitored in situ by electroanalytical methods or a grab sample can be analyzed off-line. Also, mass flow meters may be used to monitor the amount of chlorine added to the system to monitor $UCl_3$ production. Some of the $UCl_3$—NaCl mixture may be retained as a separate product, but most of the mixture is further reacted to generate batches of $UCl_3$—$UCl_4$—NaCl eutectic mixed salt compositions.

The conversion of $UCl_3$ to $UCl_4$ is done by immersing the sparge tube 145 into the $UCl_3$—NaCl eutectic mixture to continue the reaction converting $UCl_3$ to $UCl_4$ until the desired salt composition is achieved.

Ultimately, the aforementioned "desired salt composition" is the target salt, which is to say the target salt is the eutectic mixture of the now formed actinide chloride(s) with NaCl. The entire batch of salt is therefore removed from the vessel for further processing.

Metal Alloy
Detail

The liquid alloy contains actinide metals M selected from the group consisting of Th, U, Np, Pu, Am, Cm, and combinations thereof. The metal M (i.e., uranium) to be halogenated is initially alloyed with another more noble metal (i.e., Bi, Ga, Ni, Fe) to form a lower melting metal alloy. The second metal and the composition of the alloy is selected such that the alloy is molten at a temperature equal to or less than the melting point of the matrix salt, discussed infra.

Since the alloy is a liquid, the halogen gas can be sparged into the molten metal alloy to form the metal halide, $MX_n$. The metal alloy composition is maintained in a range where the alloy is a liquid at process temperatures (e.g., ranging from between 740° C. and 825° C. for uranium chloride synthesis by this method) by periodic additions of M to the metal alloy as the concentration of M decreases due to its halogenation.

Regarding the composition of the U—Ni alloy, at a temperature of 800° C. the composition of the liquid alloy can range from about 28 to 42 mole percent Ni. Preferably, the starting composition for the alloy is 33 mole percent Ni given its lowest melting point (740° C.).

Liquid alloy comprises an element selected from group consisting of cobalt, iron, nickel, bismuth, gallium, aluminum, cadmium and combinations thereof, contains a lanthanide or transition metal element resulting in formation of a lanthanide or transition metal halide dissolved in a matrix salt.

Salt Base
Detail

Generally, the salt bath is comprised of alkali and alkaline earth salts comprising alkali and alkaline earth fluorides, chlorides, bromides, iodides or combinations thereof. NaCl is the preferred salt base 110 due to its abundance in nature. However other salts may be employed so long as they contain certain characteristics.

Generally, the salt matrices are thermodynamically and kinetically stable with uranium compounds. As such, halides are selected which have a more negative free energy than the uranium chloride. Preferably, the salt has a melting point below about 800° C. in the pure or dissolved state. Further, the salt has stability against atmospheric constituents, high thermal heat conductivity and specific heat capacity, low fuel salt viscosity, is non-toxic, and has good corrosion properties if possible. The chemical stability of alkali chlorides (e.g., KCl and CsCl) and alkaline earth chlorides (e.g., $MgCl_2$ and $CaCl_2$), and combinations thereof are favorable alternatives to NaCl as the salt base 110.

The carrier salt may be comprised of LiCl, NaCl, CsCl, KCl, $CaCl_2$, or $MgCl_2$ and actinide salts. Suitable actinide salts include, but are not limited to $PuCl_4$, $UCl_3$, $ThCl_4$, $UCl_4$, $NpCl_3$, $NpI_4$, $AmCl_3$, $AmCl_2$, or $CmCl_3$, and any combinations thereof.

FIG. 1B depicts an example embodiment of an alloy crucible 130. Crucible permeability is not required so long as there is interfacial contact between the salt matrix and alloy. A permeable crucible could be used if it is chemically compatible (i.e., chemically inert) with the alloy and base salt. The molten uranium alloy pool 120 and chlorine gas 140 react to generate $UCl_3$, which is sparingly soluble in the molten alloy pool 120, such that it diffuses into the molten salt matrix 110. Metal uranium 150 can be periodically added to the molten uranium—nickel alloy in the alloy crucible 130 to replenish the converted uranium and prevent the uranium—nickel alloy from solidifying. Any nickel will remain in the alloy crucible 130 after the $UCl_3$ diffuses into the molten salt matrix 110.

The alloy crucible 130 may be repositioned or removed from the system 100 using a bale 126 within the salt matrix. The bale may comprise an elongated, heat and corrosion tolerant structure such as a bar, tube, or handle that is attached to a peripheral region of the inner crucible 130. The sparge tube 145 may be removed from the alloy crucible 130 and resubmerged into the molten salt matrix 110 and continue to feed halogen gas 140 into the system at will to allow for $UCl_3$ to react and form $UCl_4$. The $UCl_3$ will continue to react with the sparged gas 140 until the desired final composition nears that of a eutectic mixture of $UCl_3$—$UCl_4$—NaCl.

In another embodiment, the alloy crucible 130 may be porous 135, to allow for the liquid uranium nickel alloy 120 and halogen gas 140 to enter the system 100 by a steady drip system kept under pressure. Pore sizes should allow the $UCl_3$ salt to diffuse through to contact the matrix salt and dissolve. The alloy should be maintained within the crucible so that it can be replenished with uranium to remain molten.

FIG. 2 depicts a two-step process to produce a eutectic mixture of NaCl—$UCl_3$— $UCl_4$ uranium chloride salt for nuclear application. The process is carried out in a heated vessel under a dry (e.g., 100 ppm of water or less) inert atmosphere such as a furnace that is attached to or contained in a dry, inert atmosphere glovebox.

Step 1 (designated as 210) comprises producing a eutectic mixture of NaCl—$UCl_3$ formed by sparging chlorine gas into a molten U—Ni alloy contained in a chemically inert crucible submerged in molten NaCl. The crucible is initially maintained at a temperature greater than the melting point of the salt matrix, so in the case of NaCl, 801° C.

The $UCl_3$ formed in the liquid metal is less dense than the U—Ni alloy and moves to the molten metal-molten salt interface to dissolve in the molten NaCl. When the desired amount of uranium has been chlorinated and dissolved in the molten NaCl as $UCl_3$, the crucible with the U—Ni alloy can be removed from the molten salt prior to beginning the second step (designated as 220).

In the second step (220), the $UCl_3$ in the molten NaCl—$UCl_3$ can be reacted with additional chlorine gas to generate $UCl_4$ such that a salt mixture near the $UCl_3$—$UCl_4$—NaCl ternary eutectic composition is produced. FIG. 2 shows that the $UCl_3$—NaCl binary and near-ternary eutectic mixtures have much lower melting points, 508° C. and approximately 340° C. respectively, compared to the reagents NaCl (801° C.), $UCl_3$ (837° C.), and $UCl_4$ (590° C.).

As the $UCl_4$ content increases in the salt solution, the melting temperature decreases from near 508° C. for the initial $UCl_3$—NaCl eutectic to approximately 340° C. for the near ternary eutectic composition. Conversion of the $UCl_3$—NaCl binary to $UCl_3$—$UCl_4$—NaCl ternary can be completed at 550° C.

FIG. 3 depicts a flow chart of a method to produce salts containing uranium chloride. A molten NaCl salt bath is established in the first graphite crucible 125. A separate, second crucible 130 containing liquid uranium-nickel alloy 310 is submerged in the molten salt bath and may be positioned therein or removed using the bale 320.

A depending end of the sparge tube 145 is placed within the second crucible 130 so that the depending end feeds into the crucible with the liquid uranium alloy and a second, upstream end is free above the system 100 and in fluid communication with a halogen gas supply. Preferably, the sparge tube is submerged beneath the surface of the uranium alloy pool. The sparge tube 145 introduces $Cl_2$ gas 140 into the liquid uranium-nickel alloy within the crucible 330. As the $Cl_2$ gas 140 is introduced into the alloy crucible 130, sparingly soluble product $UCl_3$ rises to the surface of the uranium-nickel alloy pool and dissolves into the surrounding salt matrix pool 110, 340. Any remaining nickel remains in the second crucible 130.

In the molten salt matrix, $UCl_3$ dissolves, causing a eutectic solution within the matrix to form. While the reaction occurs 355, a reactant metal U 150 is periodically added to the liquid uranium nickel alloy in the second crucible 130, keeping the alloy molten throughout the process 345. The solution formed within the surround salt matrix comprises a eutectic mixture of $NaCl$—$UCl_3$ 350. The $UCl_3$—$NaCl$ mixture may be retained as a separate product at this point or, the liquid metal alloy 120 may be removed from the salt bath 360, or sparging may be modified, until a desired composition of $NaCl$— $UCl_3$—$UCl_4$ is achieved 370. The salt product can be transferred from the graphite crucible by pumping, vacuum transfer or pouring.

The eutectic forming reaction 355 is carried out in the salt base matrix. Aside from Na, the salt cation may be Li, K, Cs, Ba, Ca, Mg, or Be and the anion may be F, Br, or I. The reaction 355, is the further chlorination of the metal halide species, in this embodiment $UCl_3$, dissolving in the matrix to form a solution 350 comprising $UCl_3$—$NaCl$, approximately 31 mol % $UCl_3$ in NaCl.

The addition of a reactant metal U 345, replenishes the converted molten metal within the second crucible 130 and prevents the alloy from solidifying, thereby providing a means for preventing excess chlorine from escaping the system 100. Chlorine gas escape is further minimized when the gas is introduced into the second crucible via a sparge tube, wherein the sparge tube is submerged beneath the surface of the liquid alloy confined within the crucible to prevent off gassing of the halogen gas.

Example

The invented system and method can be used in electrorefining processes of separating uranium from other fuel components such as plutonium or thorium.

The fuel segments are chopped and loaded into an anode basket, which is lowered into a molten salt, usually LiCl—KCl containing a small quantity of $UCl_3$ (e.g., 5 weight percent $UCl_3$).

An electric potential is applied between the anode and cathode of the refiner, which results in dissolution of the solid metal fuel. The actinides, fission products (FP), and sodium are dissolved in the salt, which is maintained at 500° C., allowing the uranium to be recovered on the cathode, while the sodium and active metals react and displace $UCl_3$ from the molten salt.

Periodically, the $UCl_3$ needs to be replenished in the electrorefiner system so a salt comprising a eutectic composition of LiCl—KCl—$UCl_3$ is added to the refiner. Production of the LiCl—KCl—$UCl_3$ eutectic salt is accomplished using the synthesis method described.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

The invention claimed is:

1. A method for producing an actinide metal halide, the method comprising:
   a) establishing a molten salt bath;
   b) generating a liquid alloy containing an actinide metal of the metal halide in a crucible;
   c) submerging the crucible containing the liquid alloy in the molten salt bath;
   d) contacting the liquid alloy with halogen in a first reaction to form a first metal halide that dissolves in the molten salt bath, wherein the metal is more electropositive than the halogen;
   e) removing unreacted liquid alloy from the molten salt bath by removing the crucible from the molten salt bath; and
   f) contacting the first metal halide with halogen in the molten salt bath to initiate a second reaction between the halogen and the metal halide to form a second metal halide.

2. The method of claim 1 wherein the molten salt bath generated in the establishing step is comprised of alkali and alkaline earth salts comprising alkali and alkaline earth fluorides, chlorides, bromides, iodides or combinations thereof.

3. The method of claim 1 wherein after the contacting the alloy with halogen step the molten salt bath contains halide of actinide elements selected from the group consisting of Th, U, Np, Pu, Am, Cm, and combinations thereof.

4. The method of claim 1 wherein the liquid alloy contains actinide metals selected from the group consisting of Th, U, Np, Pu, Am, Cm, and combinations thereof.

5. The method of claim 1, wherein the liquid alloy further comprises an element selected from group consisting of cobalt, iron, nickel, bismuth, gallium, aluminum, cadmium and combinations thereof.

6. The method of claim 1, wherein a surface of liquid alloy is formed beneath a surface of the molten salt bath and the halogen gas is injected under the surface of the surface of the liquid alloy.

7. The method of claim 1, wherein the second metal halide is part of a eutectic mixture and the second metal halide is removed from the molten salt bath.

8. The method of claim 1 wherein the alloy containing the actinide metal of the metal halide is generated before the crucible is submerged into the molten salt bath.

9. The method of claim 1 wherein the first reaction is a direct reaction between the liquid alloy and halogen.

10. The method of claim 1 wherein the contacting the alloy with halogen in a first reaction step further comprises providing additional metal to the crucible to allow for continuous operation.

\* \* \* \* \*